United States Patent
Onodera et al.

(10) Patent No.: US 11,400,629 B2
(45) Date of Patent: Aug. 2, 2022

(54) INJECTION MOLDING DIE

(71) Applicant: TOYOTA JIDOSHA KABUSHIKI KAISHA, Toyota (JP)

(72) Inventors: Syu Onodera, Nisshin (JP); Hideaki Asuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/658,745

(22) Filed: Oct. 21, 2019

(65) Prior Publication Data
US 2020/0171726 A1   Jun. 4, 2020

(30) Foreign Application Priority Data
Nov. 29, 2018 (JP) ............................. JP2018-223308

(51) Int. Cl.
*B29C 45/26* (2006.01)
*B29C 45/36* (2006.01)

(52) U.S. Cl.
CPC .......... *B29C 45/2606* (2013.01); *B29C 45/36* (2013.01)

(58) Field of Classification Search
CPC . B29C 45/36; B29C 45/4005; B29C 45/4442; B29C 45/2606; B29C 45/2708; B29C 45/4478; B29C 45/4435; B29C 45/4421; B29C 37/02; B29C 2043/425; B29C 2045/0031; B29C 45/332; B29C 45/04; B29C 45/06; B29C 2045/36
See application file for complete search history.

(56) References Cited

U.S. PATENT DOCUMENTS

| | | | |
|---|---|---|---|
| 4,556,377 A * | 12/1985 | Brown | B29C 45/36 249/155 |
| 10,647,038 B2 * | 5/2020 | Tobita | B29D 25/00 |
| 2010/0040720 A1 * | 2/2010 | Nakagawa | B29C 45/2602 425/149 |
| 2017/0087752 A1 | 3/2017 | Tobita | |

FOREIGN PATENT DOCUMENTS

| | | |
|---|---|---|
| CN | 101351321 A | 1/2009 |
| CN | 201559273 U | 8/2010 |
| CN | 201755897 U * | 3/2011 |

(Continued)

*Primary Examiner* — Joseph S Del Sole
*Assistant Examiner* — Ariella Machness
(74) *Attorney, Agent, or Firm* — Sughrue Mion, PLLC

(57) ABSTRACT

An injection molding die includes a fixed die and a movable die that move in a die opening/closing direction relatively to each other. A cavity that is formed between the fixed die and the movable die in a die clamping state includes a lateral cavity portion that extends along the die opening/closing direction and a first orthogonal direction. The injection molding die includes a demolding core and a following core that define an end portion of the lateral cavity portion across the fixed die and the movable die in a second orthogonal direction. The demolding core and the following core are configured to be movable in the second orthogonal direction while defining the end portion of the lateral cavity portion across the fixed die and the movable die in the die clamping state, and to be engaged with the fixed die with substantially no play in the second orthogonal direction.

10 Claims, 14 Drawing Sheets

(56) References Cited

FOREIGN PATENT DOCUMENTS

| | | | | |
|---|---|---|---|---|
| CN | 106553313 | A | | 4/2017 |
| CN | 106626273 | A | | 5/2017 |
| JP | 2005-125621 | A | | 5/2005 |
| JP | 2007069507 | A | * | 3/2007 |
| JP | 2008-168547 | A | | 7/2008 |
| JP | 2017-065113 | A | | 4/2017 |
| JP | 2018114616 | A | * | 7/2018 |

* cited by examiner

INJECTION MOLDING DIE

INCORPORATION BY REFERENCE

The disclosure of Japanese Patent Application No. 2018-223308 filed on Nov. 29, 2018 including the specification, drawings and abstract is incorporated herein by reference in its entirety.

BACKGROUND

1. Technical Field

The disclosure relates to an injection molding die, and more particularly, to an injection molding die having a cavity that extends along a die opening/closing direction and a direction orthogonal to the die opening/closing direction.

2. Description of Related Art

In injection molding, a molded product is molded by injecting and pouring molten resin into a cavity (a space) that is formed between an outer die for molding an outer surface side of the molded product and an inner die for molding an inner surface side of the molded product. As a result, when the molded product is enlarged, a high injection pressure is needed to spread the molten resin all over in the cavity.

Therefore, in the case where a relatively large molded product is injection-molded, a mating surface (a die dividing surface) between the outer die and the inner die opens due to a high injection pressure, molten resin enters the die dividing surface that has opened, and burrs may be produced in the molded product.

Thus, for example, Japanese Patent Application Publication No. 2008-168547 (JP 2008-168547 A) discloses a die that is equipped with a central portion bush, a base, an outer frame portion plate, and a plurality of component pieces. The component piece opposed to the component piece fixed to the outer frame portion plate can be moved in a direction orthogonal to a die opening/closing direction by a first floating mechanism, is urged in a direction of the central portion bush by urging means, and can cope with deformation and movement of the central portion bush and the base in the direction orthogonal to the die opening/closing direction by a second floating mechanism.

According to the die of this Japanese Patent Application Publication No. 2008-168547 (JP 2008-168547 A), the differences in thermal expansion among components can be absorbed by the component piece that can be moved by the first floating mechanism and that is urged in the direction of the central portion bush, and the second floating mechanism can restrain the central portion bush and the base from being distorted or warped.

SUMMARY

When a molded product of a relatively simple shape, such as a flat plate or the like, is molded as is the case with the die of the aforementioned Japanese Patent Application Publication No. 2008-168547 (JP 2008-168547 A), a resin pressure at the time of molding is applied to the bush and the component pieces relatively uniformly and in the same direction as the die opening/closing direction. Thus, burrs can be restrained from being produced by applying a die clamping force that prevents the die dividing surface from opening.

However, in the case where a designed component of a large size and a relatively complicated shape, such as a bumper of a vehicle or the like, is molded, the resin pressure is applied to a cavity portion extending in the direction orthogonal to the die opening/closing direction (e.g., corresponding to a bumper front surface portion) substantially in the same direction as the die opening/closing direction, whereas the resin pressure may be applied to a cavity portion extending along the die opening/closing direction (e.g., corresponding to a bumper lateral surface portion) substantially in the direction orthogonal to the die opening/closing direction. When the resin pressure is thus applied in the direction different from the die opening/closing direction, the die clamping force does not act against the resin pressure. Therefore, in the case where the strength of the dies is insufficient for the resin pressure, the die dividing surface opens through deformation of the outer die in an elastic region thereof, and molten resin enters the die dividing surface that has opened. As a result, burrs may be produced.

The disclosure has been made in view of the foregoing. It is an object of the disclosure to provide an art of restraining burrs from being produced as a result of the opening of die components at the time of molding, in an injection molding die having a cavity portion that extends along a die opening/closing direction and a direction orthogonal to the die opening/closing direction.

In order to achieve the foregoing object, in the injection molding die according to the disclosure, a core that defines an end portion of the cavity portion to which the resin pressure is applied in the direction different from the die opening/closing direction at the time of molding is caused to follow deformation of the outer die, while keeping this end portion defined.

In concrete terms, the disclosure concerns an injection molding die that is equipped with an outer die for molding an outer surface side of a molded product and an inner die for molding an inner surface side of the molded product. The outer die and the inner die move in a die opening/closing direction relatively to each other. A cavity that is formed between the outer die and the inner die in a die clamping state includes a first cavity portion that extends along the die opening/closing direction and a first orthogonal direction orthogonal to the die opening/closing direction.

Moreover, the aforementioned injection molding die is further equipped with a core that defines at least part of an end portion of the first cavity portion across the outer die and the inner die in a second orthogonal direction orthogonal to the die opening/closing direction and the first orthogonal direction. The core is configured to be movable in the second orthogonal direction while defining the end portion across the outer die and the inner die in the die clamping state, and to be engaged with the outer die with substantially no play in the second orthogonal direction.

In this configuration, the cavity of the injection molding die includes the first cavity portion that extends along the die opening/closing direction and the first orthogonal direction. Thus, the region of the outer die that defines the first cavity portion may deform outward in the die opening/closing direction and the direction orthogonal to the first orthogonal direction (the second orthogonal direction) due to the resin pressure at the time of molding.

It should be noted herein that the core that defines the end portion of the first cavity portion is configured to be movable in the second orthogonal direction in the die clamping state, and to be engaged with the outer die with substantially no play in the second orthogonal direction. Thus, when the outer die deforms due to the resin pressure at the time of molding, the core moves outward in the second orthogonal direction following the outer die. In this case, a gap is created between the inner die and the core that has moved following the outer die. However, the core moves while defining the end portion of the first cavity portion across the outer die and the inner die. In other words, the gap is created at a position irrelevant to the first cavity portion. Thus, molten resin does not enter this gap. As described hitherto, even when the distance between the outer die and the inner die is increased at the end portion of the first cavity portion, the end portion of the first cavity portion remains defined by the core. Thus, burrs can be restrained from being produced as a result of the opening of the outer die and the inner die.

Owing to the foregoing, in the injection molding die having the cavity portion that extends along the die opening/closing direction and the first orthogonal direction, in other words, the cavity portion to which the resin pressure is applied in the direction different from the die opening/closing direction at the time of molding, burrs can be restrained from being produced as a result of the opening of the die components (the outer die and the inner die) at the time of molding.

Besides, in the aforementioned injection molding die, the core and the outer die may be configured to be engaged with each other at a projection portion that is provided on one of the core and the outer die and that protrudes in the die opening/closing direction, and a recess portion that can have the projection portion fitted therein, that is provided in the other of the core and the outer die, and that is recessed in the die opening/closing direction.

According to this configuration, when the outer die and the inner die move toward each other in the die opening/closing direction, the projection portion is fitted in the recess portion. Thus, the core that is engaged with the outer die with substantially no play in the second orthogonal direction in the die clamping state can be realized with a simple configuration. On the other hand, when the outer die and the inner die move away from each other in the die opening/closing direction, the projection portion leaves the recess portion. Thus, even in the case where the core is provided, the outer die and the inner die can be opened without requiring any complicated operation.

Furthermore, in the aforementioned injection molding die, the core may be configured to define at least part of the end portion of the first cavity portion in the first orthogonal direction, and to be attached, with a play in the second orthogonal direction, to a region of the inner die where the cavity is not formed.

In this configuration, when the core moves outward in the second orthogonal direction following the outer die, a gap is created between the inner die and the core. However, the core is attached to the region of the inner die where no cavity is formed, so molten resin does not enter this gap. As a result, burrs can be restrained from being produced at the end portion of the molded product in the first orthogonal direction. Besides, the core that is engaged with the outer die can move in the second orthogonal direction only within the range of the play. Thus, the outer die can be stopped from excessively deforming, while being permitted to deform outward in the second orthogonal direction to some extent.

By the way, unlike the end portion of the first cavity portion in the die opening/closing direction where an undercut is often provided, in the case where the end portion of the first cavity portion in the first orthogonal direction is defined by the core, the core hardly becomes an obstacle in demolding the molded product from the inner die. However, in the case where the end portion of the molded product in the first orthogonal direction assumes a certain shape, demolding may be more smoothly carried out when there is no core defining the end portion.

Thus, in the aforementioned injection molding die, the core may be configured as a slide core that is movable in the first orthogonal direction.

According to this configuration, if the dies are clamped after moving the core inward in the first orthogonal direction, the state where the core defines the end portion of the first cavity portion in the first orthogonal direction can be easily realized. Thus, the molded product can be molded while restraining burrs from being produced. In addition, if the core is moved outward in the first orthogonal direction after opening the dies, the end portion of the molded product in the first orthogonal direction is released. Thus, the molded product can be more smoothly demolded from the inner die.

Besides, in the aforementioned injection molding die, the core may be configured to define an end portion of the first cavity portion in the die opening/closing direction.

According to this configuration, burrs can be restrained from being produced at the end portion of the molded product in the die opening/closing direction where the undercut portion is often formed.

By the way, when the end portion of the first cavity portion in the die opening/closing direction is defined by the core, this core functions as the demolding core for the undercut portion of the molded product. However, when the amount of operation of the demolding core is large (when the undercut portion is relatively long), the molded product may be damaged through the interference with the demolding core at the time of demolding. Thus, it is conceivable to divide the demolding core into an inner component and an outer component in the second orthogonal direction, and provide a gap between the outer component and the molded product at the time of demolding. However, if the demolding core is divided into the inner component and the outer component in the second orthogonal direction, a gap is created between the inner component and the outer component when the outer component moves following the outer die at the time of molding. Molten resin then enters this gap, and burrs and the like may be produced in the molded product.

Thus, in the aforementioned injection molding die, the first cavity portion may have a second cavity portion that corresponds to a relatively long undercut portion of the molded article and that extends in the second orthogonal direction from an end portion thereof in the die opening/closing direction toward the inner die side. The core may have an inner core portion and an outer core portion that can be combined with each other in the second orthogonal direction in a dividable manner, and that define the second cavity portion together when combined with each other. The outer core portion may be configured to be engaged with the outer die in the die clamping state, with substantially no play in the second orthogonal direction. The injection molding die may be configured to be further equipped with a prohibitor that prohibits the inner core portion and the outer core portion from being divided from each other in the die clamping state.

According to this configuration, the core has the inner core portion and the outer core portion that are combined with each other in a dividable manner in the second orthogonal direction and that together define the second cavity portion corresponding to the undercut portion when combined with each other. Thus, the molded product can be restrained from being damaged through the interference with the demolding core, by dividing the inner core portion and the outer core portion from each other at the time of demolding, and separating the outer core portion from the undercut portion.

Besides, the prohibitor that prohibits the inner core portion and the outer core portion from being divided from each other in the die clamping state is provided. Thus, even when the outer core portion that is engaged with the outer die with substantially no play in the second orthogonal direction moves outward in the second orthogonal direction following the outer die, the inner core portion also moves together with the outer core portion. Therefore, a gap can be restrained from being created between the inner core portion and the outer core portion at the time of molding.

Owing to the foregoing, burrs can be restrained from being produced as a result of the opening of the die components (the inner core portion and the outer core portion) at the time of molding. Also, the molded product can be restrained from being damaged.

Furthermore, in the aforementioned injection molding die, the prohibitor may have a first hole portion that is formed through the inner core portion and that extends in the die opening/closing direction, a second hole portion that has an axial center coinciding with an axial center of the first hole portion with the inner core portion and the outer core portion combined with each other, that is formed through the outer core portion, and that extends in the die opening/closing direction, a positioning pin that is inserted into the second hole portion, and a spring that urges the positioning pin toward an opposite side of the first hole portion in the die opening/closing direction. The positioning pin may be configured to be inserted into the first hole portion against an urging force of the spring, by being pressed by the outer die, in the die clamping state.

According to this configuration, in the die clamping state, the positioning pin inserted in the second hole portion of the outer core portion is inserted into the first hole portion of the inner core portion against the urging force of the spring, by being pressed by the outer die. Therefore, the inner core portion and the outer core portion can be prohibited from being divided from each other. On the other hand, in the die opening state, the positioning pin leaves the first hole portion due to the urging force of the spring, so the inner core portion and the outer core portion can be divided from each other in the second orthogonal direction. Thus, the outer core portion can be separated from the undercut portion.

As described above, the injection molding die according to the disclosure can restrain burrs from being produced as a result of the opening of the die components at the time of molding.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Modes for carrying out the disclosure will be described hereinafter based on the drawings.

First Embodiment

—Injection Molding Die—

Figure 1:
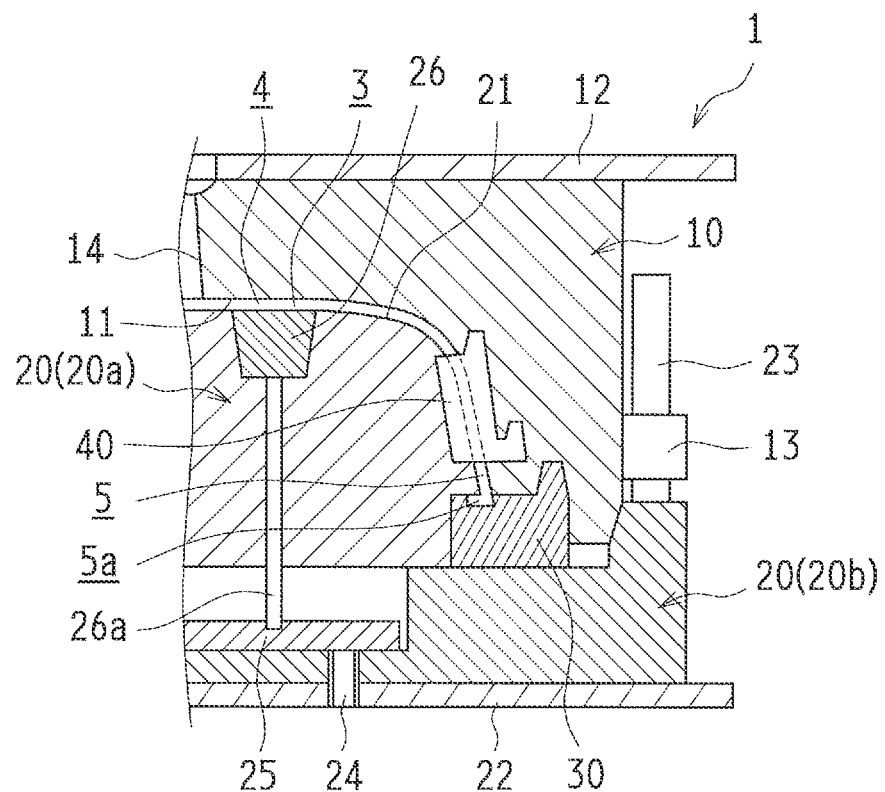
FIG. 1 is a view schematically showing an injection molding die according to the first embodiment of the disclosure.
Figure 2:
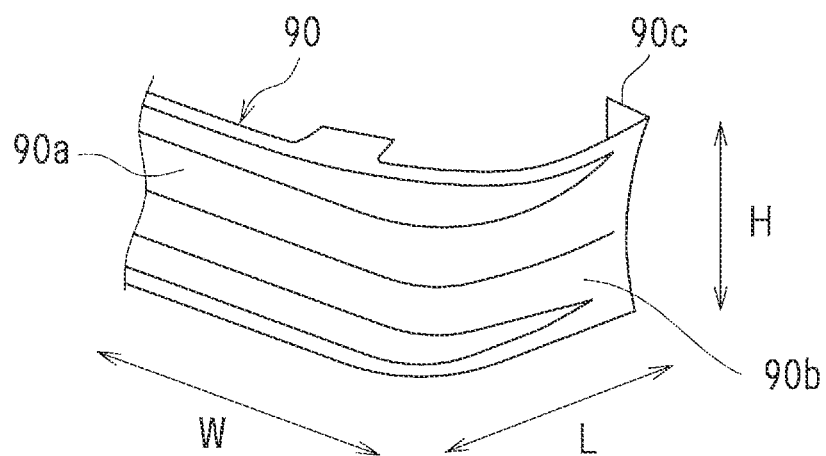
FIG. 2 is a perspective view schematically showing a bumper that is molded through the use of the injection molding die.

FIG. 1 is a view schematically showing an injection molding die 1 according to the present embodiment. FIG. 2 is a perspective view schematically showing a bumper 90 that is molded through the use of the injection molding die 1. As shown in FIG. 1, this injection molding die 1 is equipped with a fixed die 10 and a movable die 20 that move relatively to each other, a demolding core 30, and a following core 40. The bumper (a molded product) 90 for a vehicle as shown in FIG. 2 is molded by injecting and pouring molten resin into a cavity 3 that is defined by this fixed die 10, this movable die 20, this demolding core 30, and this following core 40.

As shown in FIG. 2, the bumper 90 has a front surface portion 90a that extends along a vehicle width direction (indicated by an arrow W) and a vehicle vertical direction (indicated by an arrow H), a lateral surface portion 90b that extends in a vehicle longitudinal direction (indicated by an arrow L) from both end portions of the front surface portion 90a in the vehicle width direction, and a region 90c that protrudes inward in the vehicle width direction from an end portion of the lateral surface portion 90b.

Figure 3:
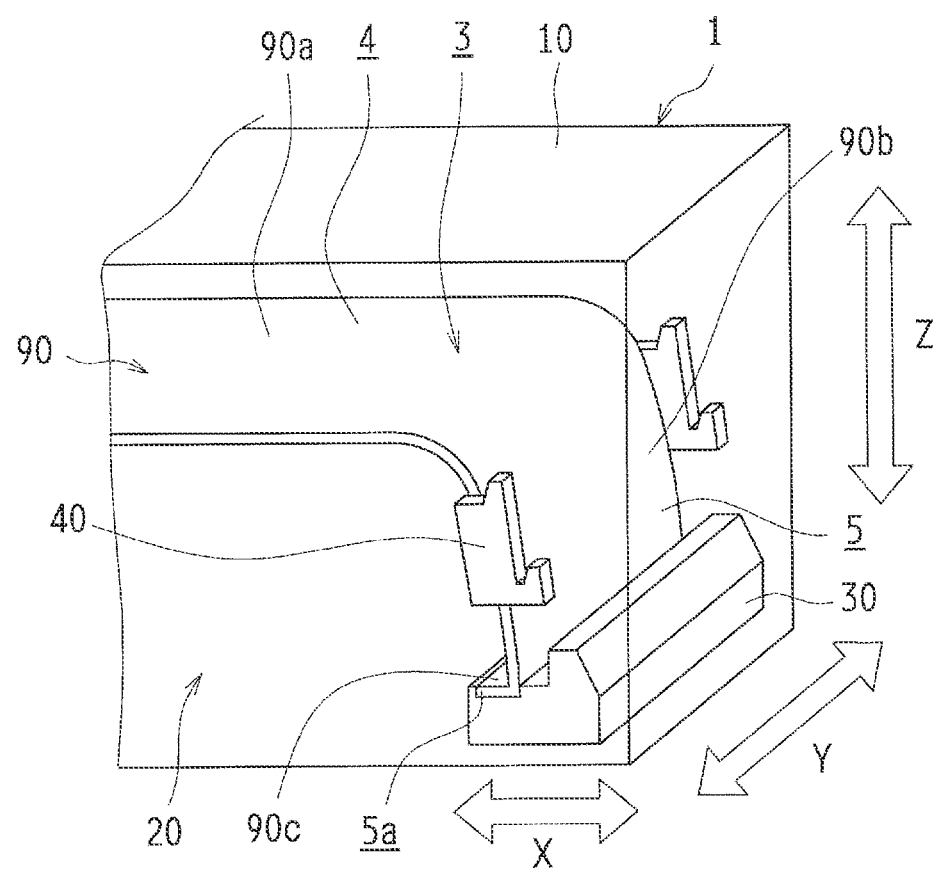
FIG. 3 is a conceptual view schematically showing the injection molding die.

The bumper 90 is molded in a posture as shown in FIG. 3, in the injection molding die 1. Thus, in the following description, a direction in which the fixed die 10 and the movable die 20 move relatively to each other (indicated by an arrow Z) will be referred to as "a die opening/closing direction Z", a direction orthogonal to the die opening/closing direction Z (indicated by an arrow Y) will be referred to as "a first orthogonal direction Y", and a direction orthogonal to the die opening/closing direction Z and the first orthogonal direction Y (indicated by an arrow X) will be referred to as "a second orthogonal direction X". Consequently, the cavity 3 of the injection molding die 1 includes an upper cavity portion 4 that corresponds to the front surface portion 90a and that extends along the first orthogonal direction Y and the second orthogonal direction X, and a lateral cavity portion (a first cavity portion) 5 that corresponds to the lateral surface portion 90b and that extends along the die opening/closing direction Z and the first orthogonal direction Y. Incidentally, the region 90c is a region referred to generally as an undercut portion that is formed in a direction substantially perpendicular to the die opening/closing direction Z, and is molded in a space portion 5a that extends inward in the second orthogonal direction X at a lower end portion of the lateral cavity portion 5.

As shown in FIG. 1, the fixed die (an outer die) 10 is attached to a molding machine (not shown) via an attachment plate 12, and has a guide pin bush 13 into which a later-described guide pin 23 is inserted. Besides, a sprue 14 is formed through the fixed die 10, and molten resin is injected and poured into the injection molding die 1 through this sprue 14.

On the other hand, as shown in FIG. 1, the movable die (an inner die) 20 is attached to the molding machine (not shown) via an attachment plate 22, and has the guide pin 23. The movable die 20 is configured to rise toward the fixed die 10 and fall away from the fixed die 10. In this case, the fixed die 10 and the movable die 20 move relatively to each other in the die opening/closing direction Z at suitable positions, through the insertion of the guide pin 23 into the guide pin bush 13. Besides, an elevation plate 25 is provided inside a lower region 20b of the movable die 20, movably in the die opening/closing direction Z relatively to the lower region 20b. On the other hand, an extrusion core 26 is provided inside an upper region 20a of the movable die 20, movably in the die opening/closing direction Z relatively to the upper region 20a. This elevation plate 25 and this extrusion core 26 are coupled to each other by an extrusion rod 26a that is provided slidably in the die opening/closing direction Z with respect to the upper region 20a. Owing to this configuration, when the elevation plate 25 rises or falls due to the elevation operation of a cylinder rod 24 of the molding machine at the time of demolding, the extrusion core 26 thereby rises or falls with respect to the upper region 20a to release the molded product 90 from the movable die 20. Incidentally, in the drawings other than FIG. 1, the sprue 14, the cylinder rod 24, the elevation plate 25, the extrusion rod 26a, the extrusion core 26 and the like are omitted for the sake of visibility of the drawings.

A recessed surface 11 that is recessed upward in the die opening/closing direction Z is formed in the fixed die 10, whereas a projecting surface 21 that is projected upward in the die opening/closing direction Z is formed on the movable die 20. The above-mentioned cavity 3 is formed between the recessed surface 11 of the fixed die 10 and the projecting surface 21 of the movable die 20, in a die clamping state where the movable die 20 is closest to the fixed die 10. Thus, the recessed surface 11 molds an outer surface side of the bumper 90, and the projecting surface 21 molds an inner surface side of the bumper 90.

Therefore, in relation to the claims, the fixed die 10 is equivalent to "the outer die for molding the outer surface side of the molded product" in the disclosure, and the movable die 20 is equivalent to "the inner die for molding the inner surface side of the molded product" in the disclosure. Besides, the above-mentioned lateral cavity portion 5 corresponding to the lateral surface portion 90b is equivalent to "the first cavity portion that extends along the die opening/closing direction and the first orthogonal direction orthogonal to the die opening/closing direction" in the disclosure.

Figure 14:
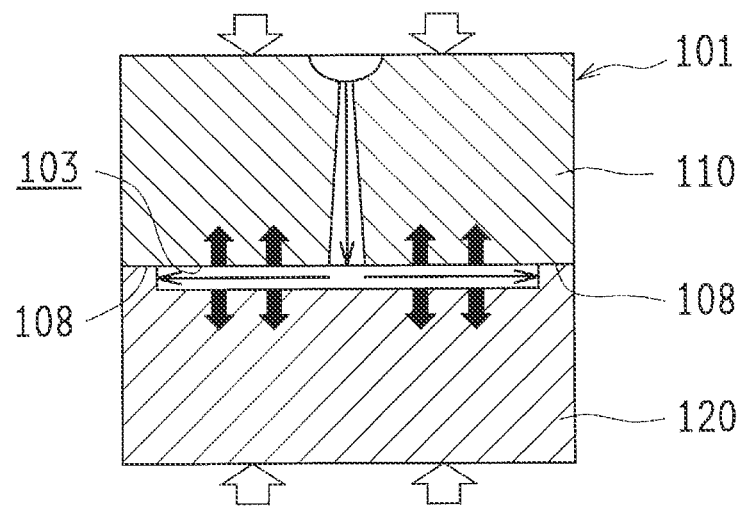
FIG. 14 is a view schematically showing a first conventional injection molding die.
Figure 15:
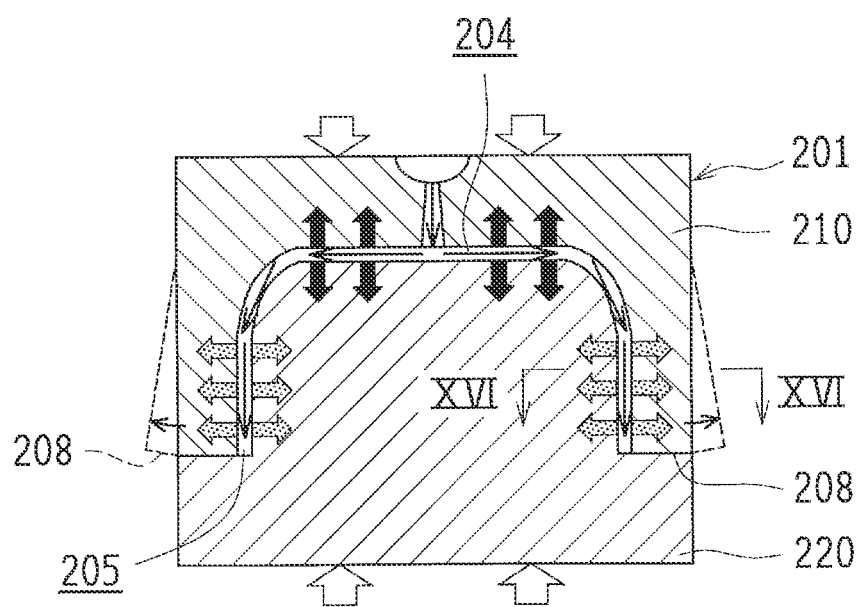
FIG. 15 is a view schematically showing a second conventional injection molding die.
Figure 16A:
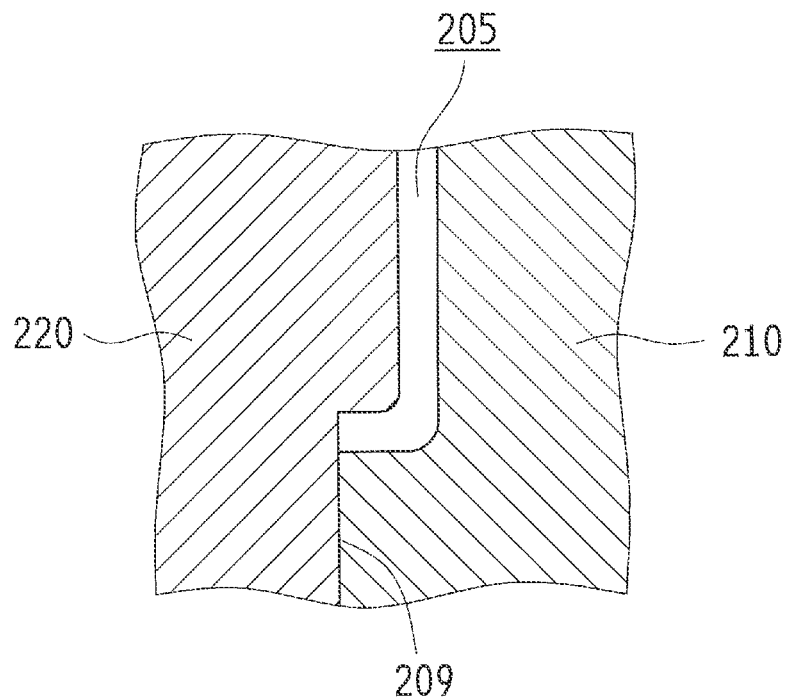
FIG. 16A is a cross-sectional view along a line XVI-XVI as viewed in the direction of arrows in FIG. 15.
Figure 16B:
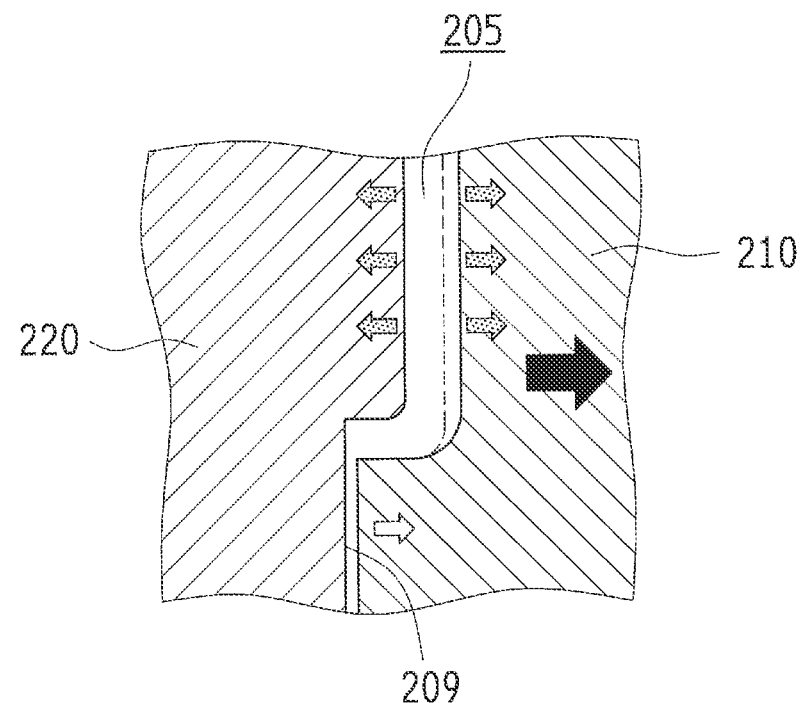
FIG. 16B is a cross-sectional view along the line XVI-XVI as viewed in the direction of the arrows in FIG. 15.

Next, the demolding core 30 and the following core 40 will be described. Prior to the description of the demolding core 30 and the following core 40, however, a first conventional injection molding die 101 and a second conventional injection molding die 201 will be described to facilitate the understanding of the disclosure. FIG. 14 is a view schematically showing the first conventional injection molding die 101. FIG. 15 is a view schematically showing the second conventional injection molding die 201. Each of FIGS. 16A and 16B is a cross-sectional view along a line XVI-XVI as viewed in the direction of arrows in FIG. 15. Incidentally, in FIGS. 14, 15, and 16A, the molten resin with which a cavity 103, an upper cavity portion 204, and a lateral cavity portion 205 are filled is omitted for the sake of visibility of the drawings.

In the first conventional injection molding die 101, as shown in FIG. 14, the molded product is molded by injecting and pouring molten resin into the cavity 103 that is formed between a fixed die 110 and a movable die 120. However, when the molded product is enlarged, a high injection pressure is needed to spread molten resin all over in the cavity 103. Therefore, in the case of injection molding of a relatively large molded product, a mating surface (a die dividing surface) 108 between the fixed die 110 and the movable die 120 in a die opening/closing direction (a vertical direction in FIG. 14) opens due to the high injection pressure, and molten resin enters the die dividing surface 108 that has opened. As a result, burrs may be produced in the molded product.

However, in the case where a molded product of a relatively simple shape, such as a flat plate or the like, is molded as is the case with the first conventional injection molding die 101, a resin pressure at the time of molding (see blackened arrows) is applied in the same direction as the die opening/closing direction. Thus, burrs can be restrained from being produced, by applying a die clamping force (see blank arrows) that prevents the die dividing surface 108 from opening.

In contrast, in the case where a designed component of a relatively large size and a relatively complicated shape such as that of the present embodiment is molded as is the case with the second conventional injection molding die 201, a resin pressure (see blackened arrows) is applied in the same direction as the die opening/closing direction (a vertical direction in FIG. 15) in the upper cavity portion 204, whereas a resin pressure (see dotted arrows) is applied to the lateral cavity portion 205 in the second orthogonal direction (a lateral direction in FIG. 15). When the resin pressure is thus applied in a direction different from the die opening/closing direction, a die clamping force (see blank arrows) does not act against the resin pressure. Therefore, in the case where the strength of the dies is insufficient for the resin pressure, a fixed die 210 deforms outward in an elastic region thereof, and a die dividing surface 208 between the fixed die 210 and a movable die 220 in the die opening/closing direction opens, as indicated by broken lines in FIG. 15. As a result, burrs may be produced.

Besides, in the lateral cavity portion 205, a die dividing surface 209 in the second orthogonal direction is often set at an end portion of the lateral cavity portion 205 in the first orthogonal direction (a direction orthogonal to the sheet of FIG. 15) as well, as shown in FIG. 16A. Therefore, when the fixed die 210 deforms outward in the second orthogonal direction in the elastic region thereof (see blackened arrows) due to a resin pressure (see dotted arrows) at the time of molding as shown in FIG. 16B, the die dividing surface 209 opens in the second orthogonal direction as indicated by blank arrows, and molten resin enters the die dividing surface 209 that has opened. As a result, burrs may be produced.

Thus, in the present embodiment, the cores 30 and 40 that define the end portion of the lateral cavity portion 5 to which the resin pressure is applied in a direction different from the die opening/closing direction Z at the time of molding are caused to follow deformation of the fixed die 10 while keeping the end portion defined.

In concrete terms, in the injection molding die 1 of the present embodiment, as shown in FIG. 1, the demolding core 30 and the following core 40 that define at least part of the end portion of the lateral cavity portion 5 across the fixed die 10 and the movable die 20 in the second orthogonal direction X are configured to be movable in the second orthogonal direction X while defining the end portion of the lateral cavity portion 5, and to be engaged with the fixed die 10 with substantially no play in the second orthogonal direction X. The demolding core 30 and the following core 40 will be separately described hereinafter in detail.

—Demolding Core—

Figure 4A:
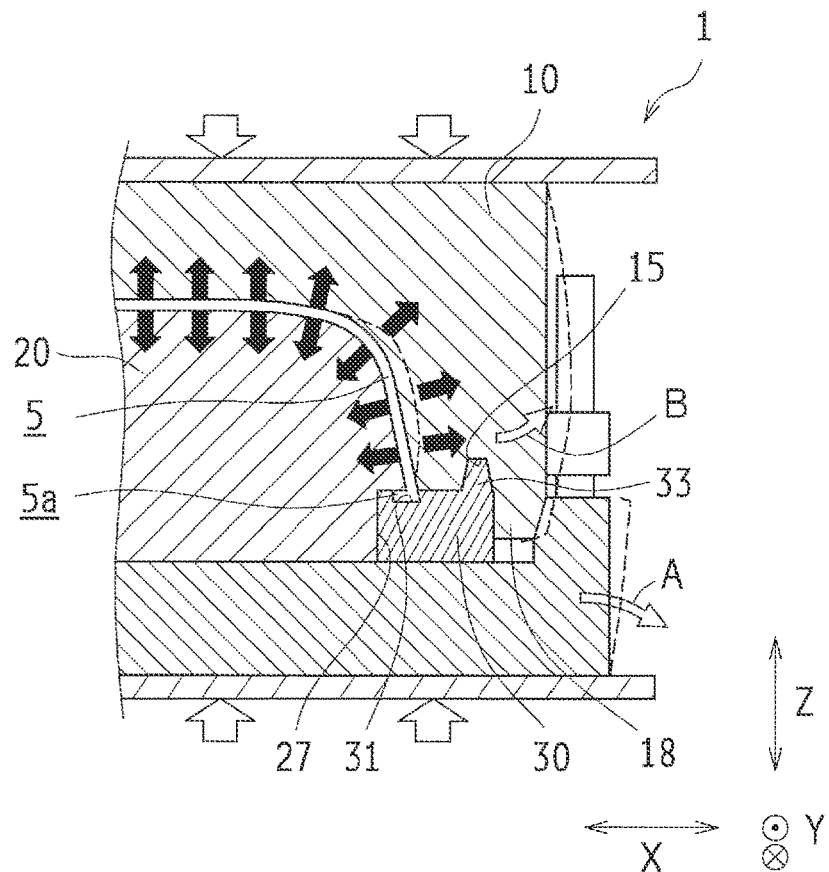
FIG. 4A is a view schematically illustrating a demolding core, and is a view showing a position of arrangement of the demolding core in the injection molding die.
Figure 4B:
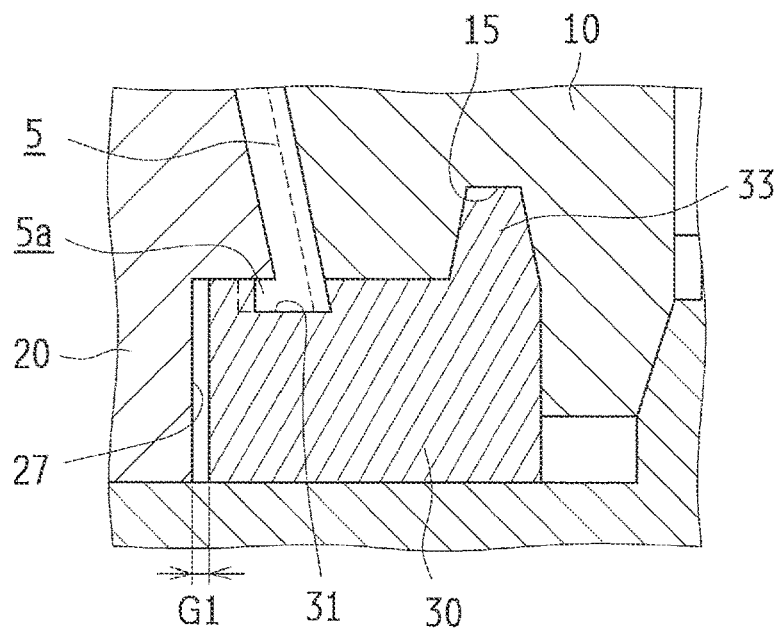
FIG. 4B is a view schematically illustrating the operation of the demolding core at the time of molding.

Each of FIGS. 4A and 4B is a view schematically illustrating the demolding core 30. FIG. 4A is a view showing an arrangement position of the demolding core 30 in the injection molding die 1, and FIG. 4B is a view schematically illustrating the operation of the demolding core 30 at the time of molding. Incidentally, in FIGS. 4A and 4B, the molten resin with which the cavity 3 is filled is omitted for the sake of the visibility of the drawings. Besides, in FIG. 4B, a gap G1 is shown in an exaggerated manner for the sake of visibility of the drawing.

The demolding core 30 is formed as an elongated member extending in the first orthogonal direction Y, and defines the lower end portion of the lateral cavity portion 5 in the die opening/closing direction Z (a region corresponding to the end portion of the lateral surface portion 90b of the bumper 90) along an entire length thereof in the first orthogonal direction Y across the fixed die 10 and the movable die 20 in the second orthogonal direction X as shown in FIG. 4A. More specifically, a recessed streak portion 31 that extends in the first orthogonal direction Y is formed in the demolding core 30, and the space portion 5a provided at the lower end portion of the lateral cavity portion 5 is defined by this recessed streak portion 31.

Besides, the demolding core 30 is fitted in a dug portion 27 formed in the movable die 20, but is configured to be movable in the second orthogonal direction X instead of being fixed to the movable die 20. Furthermore, a projection portion 33 that protrudes in the die opening/closing direction Z and that is fitted in (engaged with) a recess portion 15 that is formed in the fixed die 10 in such a manner as to be recessed in the die opening/closing direction Z with substantially no play is formed on the demolding core 30.

When the movable die 20 is moved toward the fixed die 10 and clamped after the demolding core 30 formed as described above is fitted in the dug portion 27 of the movable die 20, the projection portion 33 of the demolding core 30 is fitted in the recess portion 15 of the fixed die 10. On the other hand, when the movable die 20 is moved away from the fixed die 10 and opened, the projection portion 33 is disengaged from the recess portion 15. As described hitherto, the demolding core 30 and the fixed die 10 are removably engaged with each other in the die opening/closing direction Z, but the projection portion 33 is fitted in the recess portion 15 with substantially no play in the die clamping state. Thus, when the fixed die 10 deforms outward in the second orthogonal direction X in the elastic region thereof, the demolding core 30 moves outward in the second orthogonal direction X following the deformation of the fixed die 10.

When the demolding core 30 moves outward in the second orthogonal direction X, the gap G1 is created between the movable die 20 and the demolding core 30 as shown in FIG. 4B. However, this gap G1 is created at a position irrelevant to the lateral cavity portion 5, so burrs as in the case of the second conventional injection molding die 201 are not produced. Besides, when the demolding core 30 moves outward in the second orthogonal direction X, the position of the recessed streak portion 31 slightly deviates outward in the second orthogonal direction X from an original position indicated by an alternate long and two short dashes line, but the space portion 5a remains defined by the recessed streak portion 31. As described hitherto, when the demolding core 30 of the present embodiment is used, the molded product (the lateral surface portion 90b of the bumper 90) becomes somewhat thick due to outward deformation of the fixed die 10 in the second orthogonal direction X. However, following the fixed die 10, the demolding core 30 moves outward in the second orthogonal direction X while defining the space portion 5a across the fixed die 10 and the movable die 20. Thus, burrs can be restrained from being produced in the molded product 90.

—Following Core—

In the present embodiment, even when the fixed die 10 deforms outward in the second orthogonal direction X, burrs can be restrained from being produced at the lower end portion of the lateral cavity portion 5 in the die opening/closing direction Z, by the demolding core 30, as described above. Besides, as shown in FIG. 4A, there are also cases where the deformation itself of the fixed die 10 at the lower end portion in the die opening/closing direction Z as indicated by an arrow A can be suppressed by holding a cotter 18 of the fixed die 10 in contact with the movable die 20.

However, even if the fixed die 10 can be restrained from deforming at the lower end portion of the lateral cavity portion 5 in the die opening/closing direction Z, the lateral cavity portion 5 may bulge at a center thereof as indicated by an arrow B in FIG. 4A. When the lateral cavity portion 5 thus bulges at the center thereof, burrs may be produced through the opening of the die dividing surface in the second orthogonal direction X as is the case with FIG. 16B.

Figure 5:
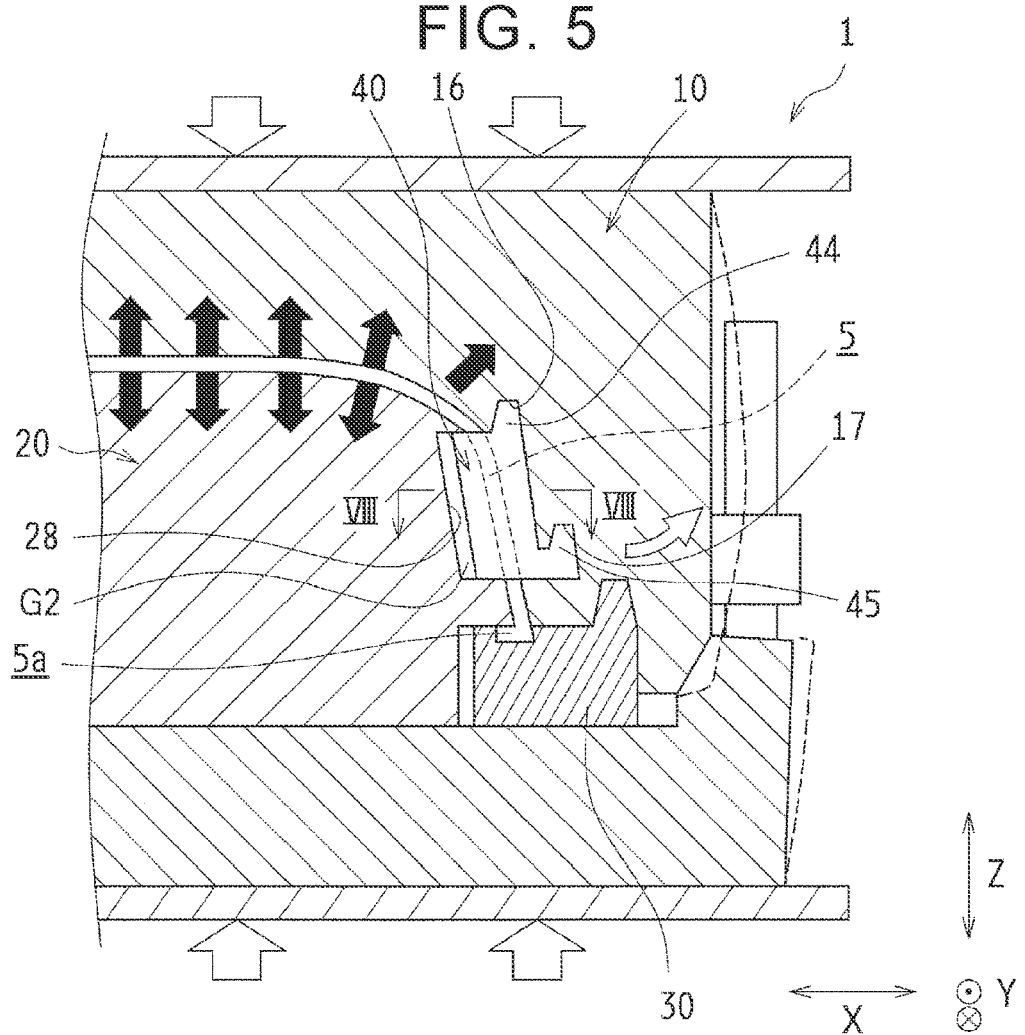
FIG. 5 is a view schematically illustrating a following core.
Figure 6:
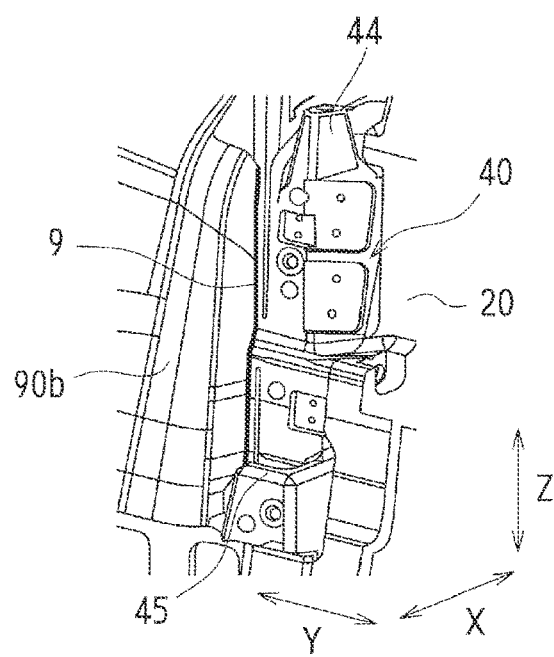
FIG. 6 is a perspective view schematically showing the following core.
Figure 7A:
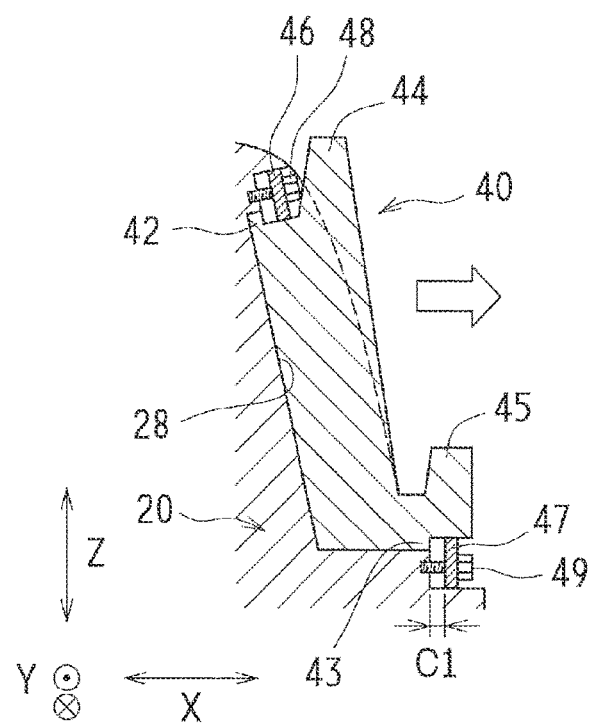
FIG. 7A is a view schematically illustrating a mounting structure of the following core.
Figure 7B:
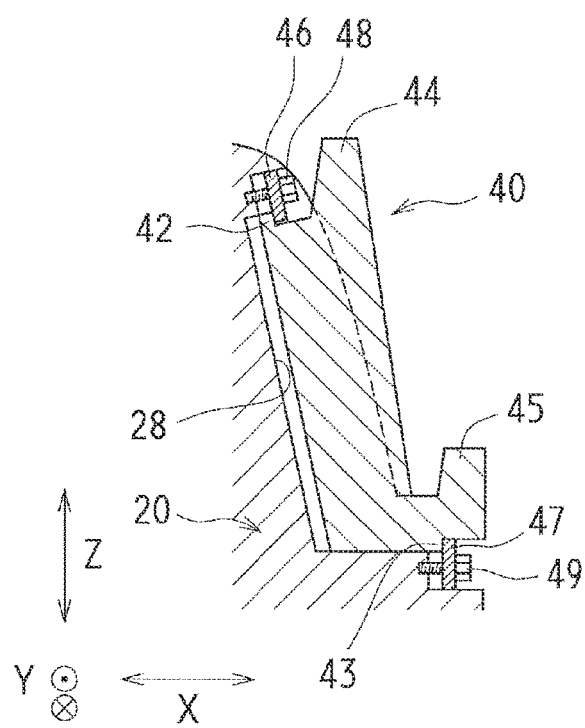
FIG. 7B is a view schematically illustrating the mounting structure of the following core.
Figure 8:
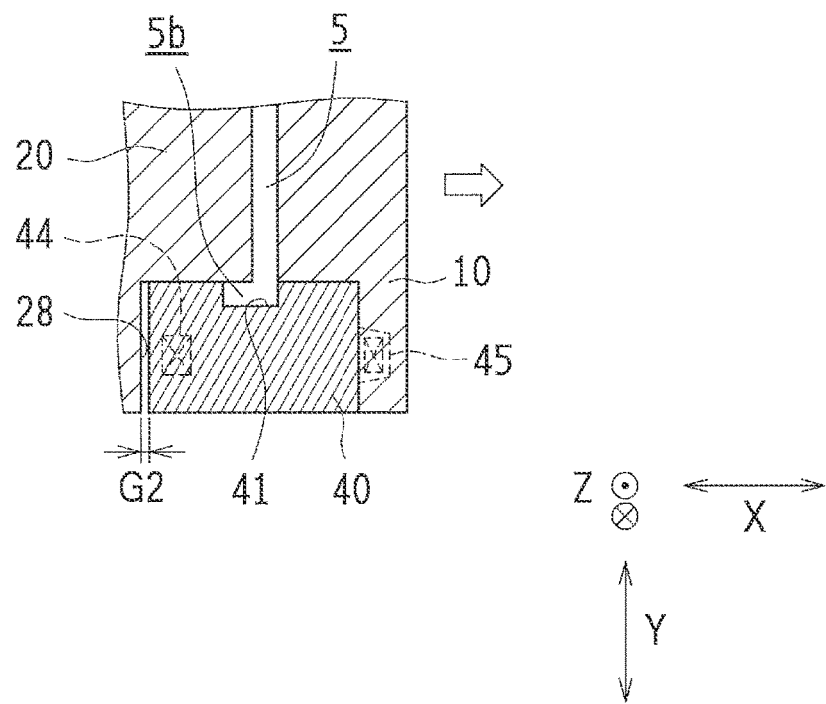
FIG. 8 is a cross-sectional view along a line VIII-VIII as viewed in the direction of arrows in FIG. 5.

Thus, in the present embodiment, the demolding core 30 and the following core 40 are used in combination with each other, as shown in FIG. 1. FIG. 5 is a view schematically illustrating the following core 40. FIG. 6 is a perspective view schematically showing the following core 40. Each of FIGS. 7A and 7B is a view schematically illustrating a mounting structure of the following core 40. FIG. 8 is a cross-sectional view along a line VIII-VIII as viewed in the direction of arrows in FIG. 5. Incidentally, in FIGS. 5 and 8, the molten resin with which the cavity 3 is filled is omitted for the sake of visibility of the drawings. Besides, in FIG. 8, a gap G2 is shown in an exaggerated manner for the sake of visibility of the drawing. Furthermore, FIG. 6 shows the following core 40 on a depth side in the first orthogonal direction Y in FIG. 3.

As shown in FIG. 5, the following core 40 partially defines end portions of the lateral cavity portion 5 in the first orthogonal direction Y (regions corresponding to an upper end portion and a lower end portion of the lateral surface portion 90b of the bumper 90). Thus, the following core 40 defines the end portion of the lateral cavity portion 5 in the first orthogonal direction Y, which extends in the die opening/closing direction Z while being inclined outward in the second orthogonal direction X, and hence is formed substantially in the shape of an obliquely inclined column as shown in FIG. 6. As shown in FIG. 8, a recessed streak portion 41 that extends in the die opening/closing direction Z in such a manner as to match the shape of the lateral cavity portion 5 is formed in this following core 40. The following core 40 is provided across the fixed die 10 and the movable die 20 in the second orthogonal direction X, and a space portion 5b of the end portion of the lateral cavity portion 5 in the first orthogonal direction Y is defined by this recessed streak portion 41. That is, in the present embodiment, unlike the second conventional injection molding die 201 having the fixed die 210 and the movable die 220 that form the die dividing surface 209, a die dividing surface 9 (see FIG. 6) is formed by the fixed die 10, the movable die 20, and the following core 40.

Besides, as shown in FIG. 7A, the following core 40 is fitted in a dug portion 28 formed in the movable die 20, and is configured to be movable in the second orthogonal direction X with respect to the movable die 20. More specifically, the following core 40 is fitted in the dug portion 28 formed in the movable die 20 inside the lateral cavity portion 5 in the second orthogonal direction X, and is assembled in such a manner as not to be disengaged from the movable die 20, by pressing plates 46 and 47 attached to upper and lower sections of the dug portion 28 by bolts 48 and 49 respectively. However, the following core 40 is not fixed to the movable die 20 by the pressing plates 46 and 47. A clearance C1 is provided in the second orthogonal direction X between each of an upper abutment portion 42 and a lower abutment portion 43 of the following core 40 and each of the upper pressing plate 46 and the lower pressing plate 47. That is, the following core 40 is attached to a region of the movable die 20 where the cavity 3 is not formed, with a play in the second orthogonal direction X. Thus, as shown in FIG. 7B, the following core 40 can move in the second orthogonal direction X between the dug portion 28 and the pressing plates 46 and 47 until the upper abutment portion 42 and the lower abutment portion 43 abut on the pressing plates 46 and 47 respectively.

Furthermore, as shown in FIGS. 5 to 7B, projection portions 44 and 45 that protrude in the die opening/closing direction Z and that are fitted in (engaged with), with substantially no play, recess portions 16 and 17 formed in the fixed die 10 and recessed in the die opening/closing direction Z are formed on the following core 40.

When the movable die 20 is moved toward the fixed die 10 and clamped, the projection portions 44 and 45 of the following core 40 formed as described above are fitted in the recess portions 16 and 17 of the fixed die 10 respectively. On the other hand, when the movable die 20 is moved away from the fixed die 10 and opened, the projection portions 44 and 45 are disengaged from the recess portions 16 and 17 respectively. As described hitherto, the following core 40 and the fixed die 10 are removably engaged with each other in the die opening/closing direction Z. However, in the die clamping state, the projection portions 44 and 45 are fitted in the recess portions 16 and 17 respectively with substantially no play. Thus, when the fixed die 10 deforms outward in the second orthogonal direction X in the elastic region thereof, the following core 40 is pulled outward in the second orthogonal direction X. The following core 40 can move in the second orthogonal direction X within the range of the play (the clearance C1). Thus, as shown in FIG. 5, the following core 40 moves outward in the second orthogonal direction X following the deformation of the fixed die 10. Thus, the fixed die 10 can be stopped from excessively deforming, through the abutment of the upper abutment portion 42 and the lower abutment portion 43 on the pressing plates 46 and 47, while permitting the fixed die 10 to deform outward in the second orthogonal direction X to some extent.

As indicated by a blank arrow in FIG. 8, when the following core 40 moves outward in the second orthogonal direction X, the gap G2 is created between the movable die 20 and the following core 40. However, this gap G2 is created at a position irrelevant to the lateral cavity portion 5, so burrs as in the case of the second conventional injection molding die 201 are not produced. Besides, when the following core 40 moves outward in the second orthogonal direction X, the position of the recessed streak portion 41 slightly deviates outward in the second orthogonal direction X, but the space portion 5b remains defined by the recessed streak portion 41. As described hitherto, when the following core 40 of the present embodiment is used, the molded product (the lateral surface portion 90b of the bumper 90) becomes slightly thick due to outward deformation of the fixed die 10 in the second orthogonal direction X, but the following core 40 moves outward in the second orthogonal direction X while defining the space portion 5b across the fixed die 10 and the movable die 20, following the fixed die 10. Thus, burrs can be restrained from being produced in the molded product 90.

As described above, according to the present embodiment, burrs can be restrained from being produced as a result of the opening of the die components (the fixed die 10 and the movable die 20) at the time of molding, with a simple configuration in which the injection molding die 1 having the lateral cavity portion 5 that extends along the die opening/closing direction Z and the first orthogonal direction Y, in other words, the cavity portion to which the resin pressure is applied in the direction different from the die opening/closing direction Z is provided with the demolding core 30 and the following core 40.

Modification Example

The present modification example is different from the aforementioned first embodiment in that a following core 50 is configured as a slide core. What is different from the first embodiment will be mainly described hereinafter.

As shown in the above-mentioned FIG. 8, in the case where the end portion of the lateral cavity portion 5 in the first orthogonal direction Y is defined by the following core 40, the movable die 20 and the following core 40 are removed from the molded product 90 molded in the lateral cavity portion 5 in the direction orthogonal to the sheet of FIG. 8, so the following core 40 hardly becomes an obstacle at the time of demolding. However, when the end portion of the molded product 90 in the first orthogonal direction Y assumes a certain shape, the absence of the following core 40 at the time of demolding may ensure smooth demolding from the movable die 20.

Figure 9A:
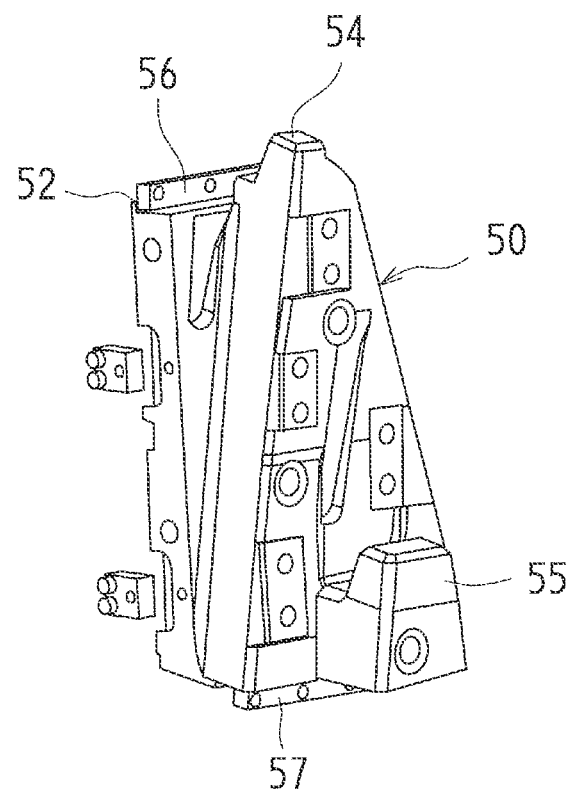
FIG. 9A is a perspective view schematically showing a following core according to a modification example of the first embodiment.
Figure 9B:
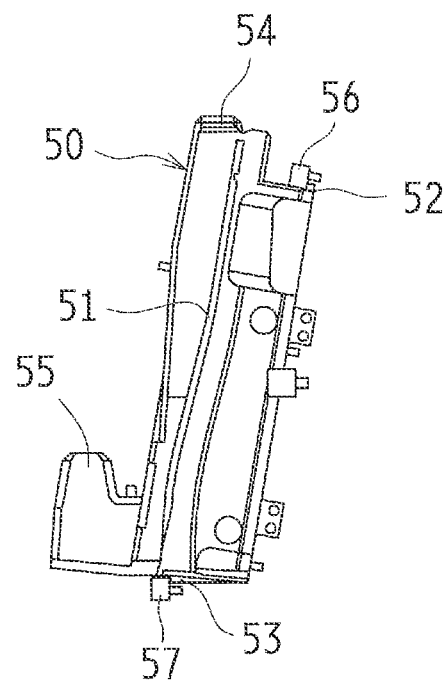
FIG. 9B is a lateral view schematically showing the following core according to the modification example of the first embodiment.
Figure 10:
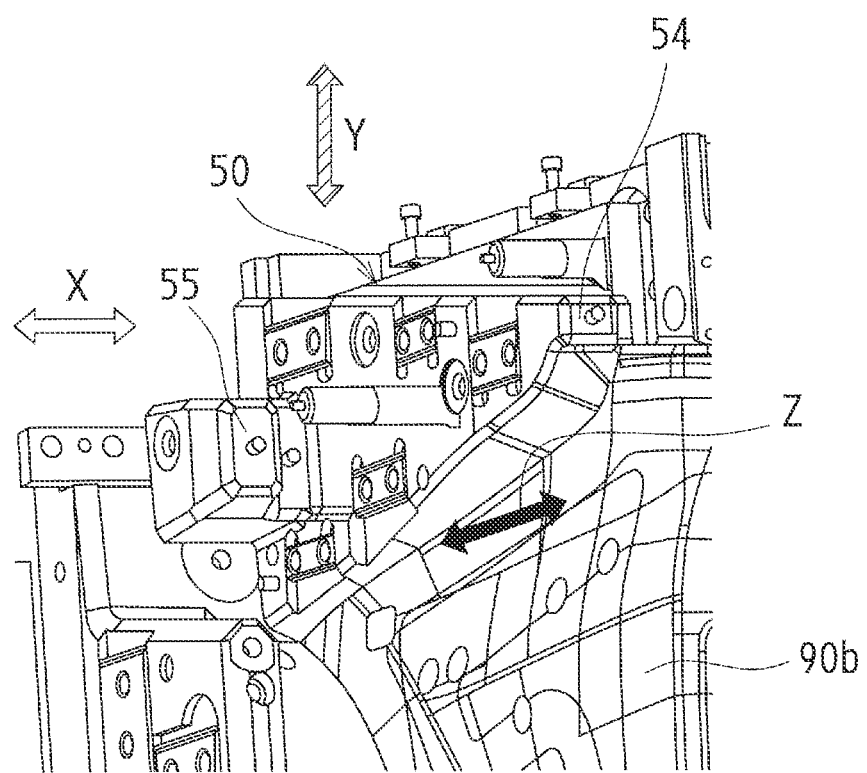
FIG. 10 is a view schematically illustrating a moving direction of the following core.
Figure 11A:
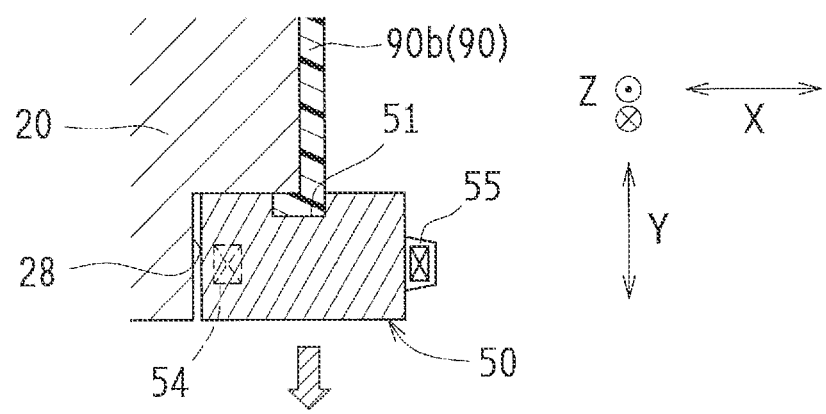
FIG. 11A is a view schematically illustrating the operation of the following core.
Figure 11B:
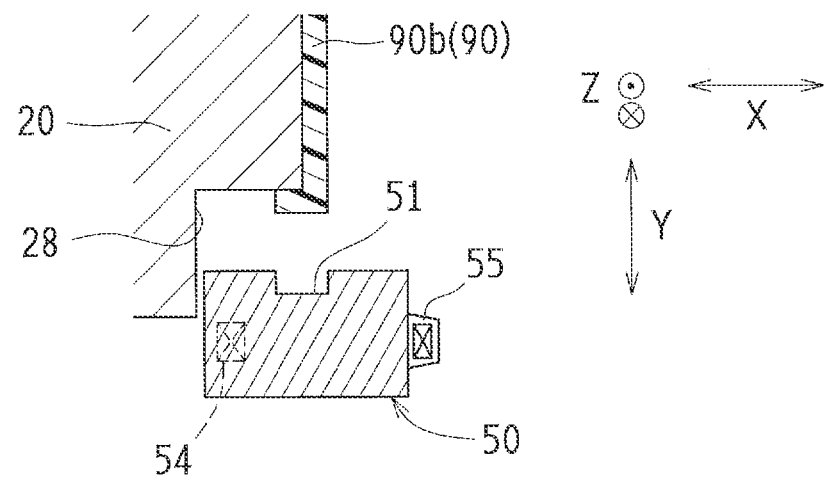
FIG. 11B is a view schematically illustrating the operation of the following core.

Thus, in the present modification example, the following core 50 is configured as a slide core that can move in the first orthogonal direction Y. Each of FIGS. 9A and 9B is a view schematically showing the following core 50 according to the present modification example. FIG. 9A is a perspective view, and FIG. 9B is a lateral view. Besides, FIG. 10 is a view schematically illustrating the moving direction of the following core 50, and each of FIGS. 11A and 11B is a view schematically illustrating the operation of the following core 50.

As is the case with the following core 40, the following core 50 is formed substantially in the shape of an obliquely inclined column as shown in FIGS. 9A and 9B. The following core 50 is provided across the fixed die 10 and the movable die 20 in the second orthogonal direction X, and the end portion of the lateral cavity portion 5 in the first orthogonal direction Y is defined by a recessed streak portion 51 shown in FIG. 9B.

Besides, as is the case with the following core 40, the following core 50 is fitted in the dug portion 28 formed in the movable die 20, and is attached thereto with a play (a clearance) in the second orthogonal direction X, by pressing plates 56 and 57 attached to the upper and lower sections of the dug portion 28 by bolts respectively. However, the pressing plates 56 and 57 extend in the first orthogonal direction Y as shown in FIG. 9A unlike the case of the following core 40, and an upper abutment portion 52 and a lower abutment portion 53 of the following core 50, which are opposed to these pressing plates 56 and 57 respectively, also extend in the first orthogonal direction Y. Thus, the following core 50 is not only movable between the dug portion 28 and the pressing plates 56 and 57 in the second orthogonal direction X but also movable in the first orthogonal direction Y along the elongated pressing plates 56 and 57 as shown in FIG. 10, until the upper abutment portion 52 and the lower abutment portion 53 abut on the pressing plates 56 and 57 respectively. Incidentally, the following core 50 is moved in the first orthogonal direction Y by, for example, a drive mechanism (not shown).

When the movable die 20 is moved toward the fixed die 10 and clamped after the following core 50 formed as described above is moved inward in the first orthogonal direction Y along the pressing plates 56 and 57 until the surface in which the recessed streak portion 51 is formed abuts on the movable die 20, projection portions 54 and 55 of the following core 50 are fitted in the recess portions 16 and 17 of the fixed die 10 respectively. Thus, in the die clamping state, the projection portions 54 and 55 are fitted in the recess portions 16 and 17 respectively with substantially no play, so the following core 50 cannot move in the first orthogonal direction Y. However, a clearance is provided in the second orthogonal direction X between each of the upper abutment portion 52 and the lower abutment portion 53 and each of the upper and lower pressing plates 56 and 57. Thus, when the fixed die 10 deforms outward in the second orthogonal direction X, the following core 50 moves outward in the second orthogonal direction X, following the deformation of the fixed die 10. Therefore, as is the case with the following core 40, burrs can be restrained from being produced.

After the completion of molding, when the movable die 20 is moved away from the fixed die 10 and opened, the projection portions 54 and 55 are disengaged from the recess portions 16 and 17 respectively, so the following core 50 can move again in the first orthogonal direction Y as indicated by a hatched arrow in FIG. 11A. Then, when the following core 50 is moved outward in the first orthogonal direction Y along the pressing plates 56 and 57 away from the movable die 20 as shown in FIG. 11B, an end portion of the molded product 90 in the first orthogonal direction Y is released, so the molded product 90 can be more smoothly demolded from the movable die 20.

Second Embodiment

The present embodiment is different from the aforementioned first embodiment in that a demolding core 60 is configured in a dividable manner. What is different from the first embodiment will mainly be described hereinafter.

Figure 17A:
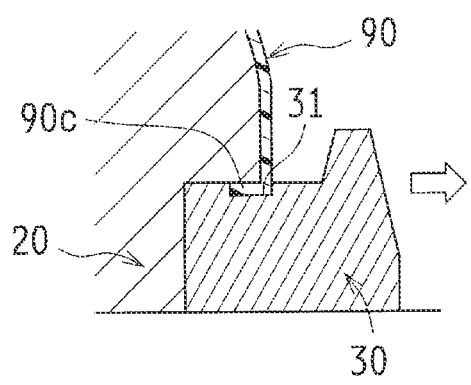
FIG. 17A is a view schematically illustrating the operation of a demolding core at the time of demolding.
Figure 17B:
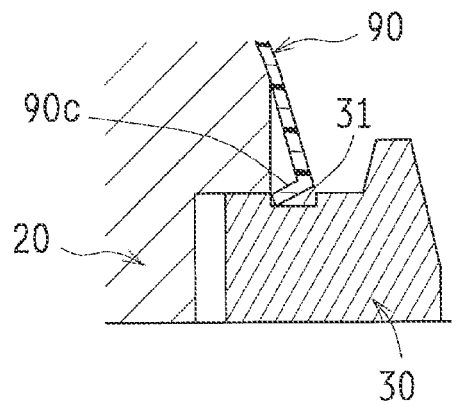
FIG. 17B is a view schematically illustrating the operation of the demolding core at the time of demolding.

Each of FIGS. 17A to 17D is a view schematically illustrating the operation of the demolding core 30 at the time of demolding. When the molded product 90 on which an undercut portion 90c is hooked is demolded from the movable die 20 after the fixed die 10 and the movable die 20 are opened, the molded product 90 is often demolded from the movable die 20 after pulling the demolding core 30 outward in the second orthogonal direction X through the use of the drive mechanism (not shown) as indicated by a blank arrow in FIG. 17A, and then stopping the undercut portion 90c from being hooked as shown in FIG. 17B.

Figure 17C:
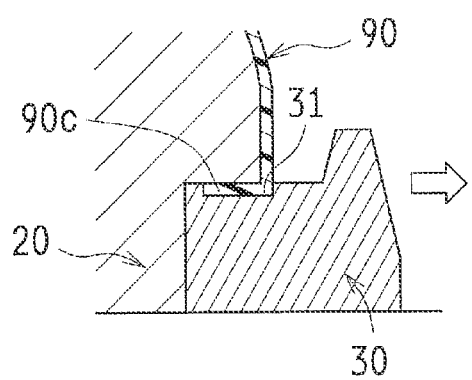
FIG. 17C is a view schematically illustrating the operation of the demolding core at the time of demolding.
Figure 17D:
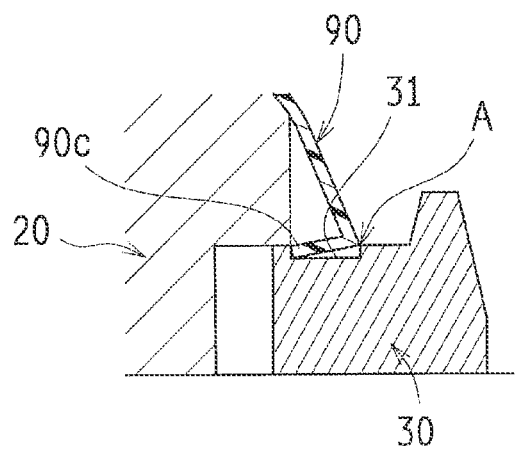
FIG. 17D is a view schematically illustrating the operation of the demolding core at the time of demolding.

However, when the amount of operation of the demolding core 30 in the second orthogonal direction X is large, in other words, when the undercut portion 90c is relatively long as shown in FIG. 17C, the recessed streak portion 31 of the demolding core 30 and the undercut portion 90c interfere with each other at a portion A of FIG. 17D at the time of demolding, so the molded product 90 may be damaged.

Figure 18:
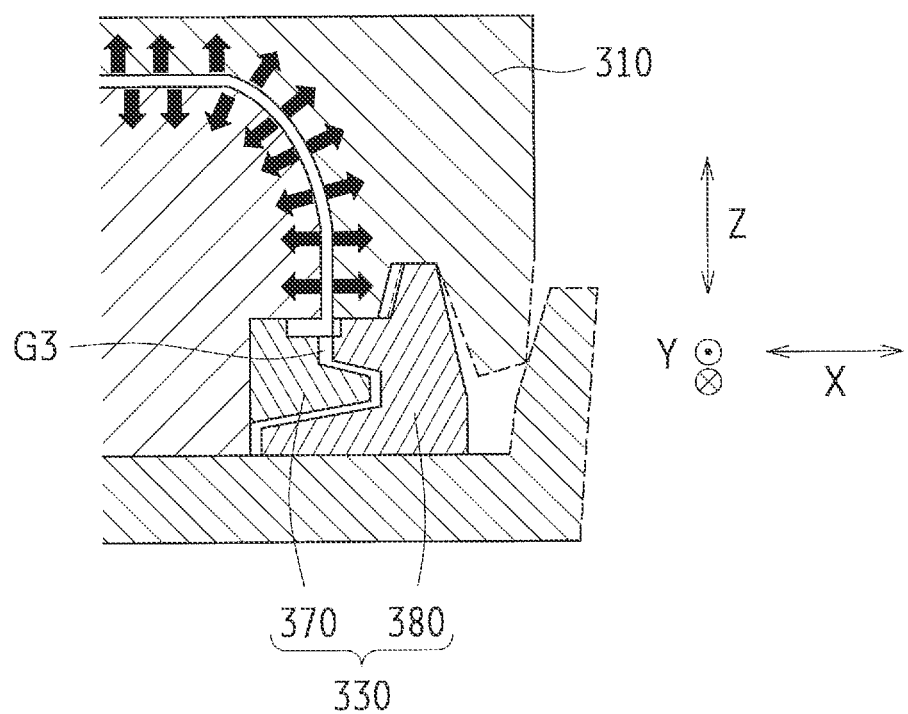
FIG. 18 is a view schematically illustrating a problem of a dividable-type demolding core.

Thus, it is conceivable to make a demolding core 330 dividable into an inner component 370 and an outer component 380 in the second orthogonal direction X, and provide a gap between the outer component 380 and the molded product at the time of demolding to restrain the demolding core 330 and the molded product from interfering with each other, as shown in FIG. 18. However, in the aforementioned first embodiment, the demolding core 30 can be moved outward in the second orthogonal direction X following the deformation of the fixed die 10 so as to restrain burrs from being produced in the molded product 90, as described above. Thus, in the case where the demolding core 330 is divided into the inner component 370 and the outer component 380 in the second orthogonal direction X, when the outer component 380 moves following a fixed die 310 at the time of molding, a gap G3 is created between the inner component 370 and the outer component 380, molten resin enters this gap G3, and burrs and the like may be produced in the molded product.

Thus, with a view to coping with a case where the undercut portion 90c is relatively long, in an injection molding die 1' according to the present embodiment, the demolding core 60 is composed of an inner core portion 70 and an outer core portion 80 that are combined with each other in a dividable manner in the second orthogonal direction X, and the inner core portion 70 and the outer core portion 80 are prohibited from being divided from each other in the die clamping state. The demolding core 60 will be described hereinafter in detail.

Figure 12:
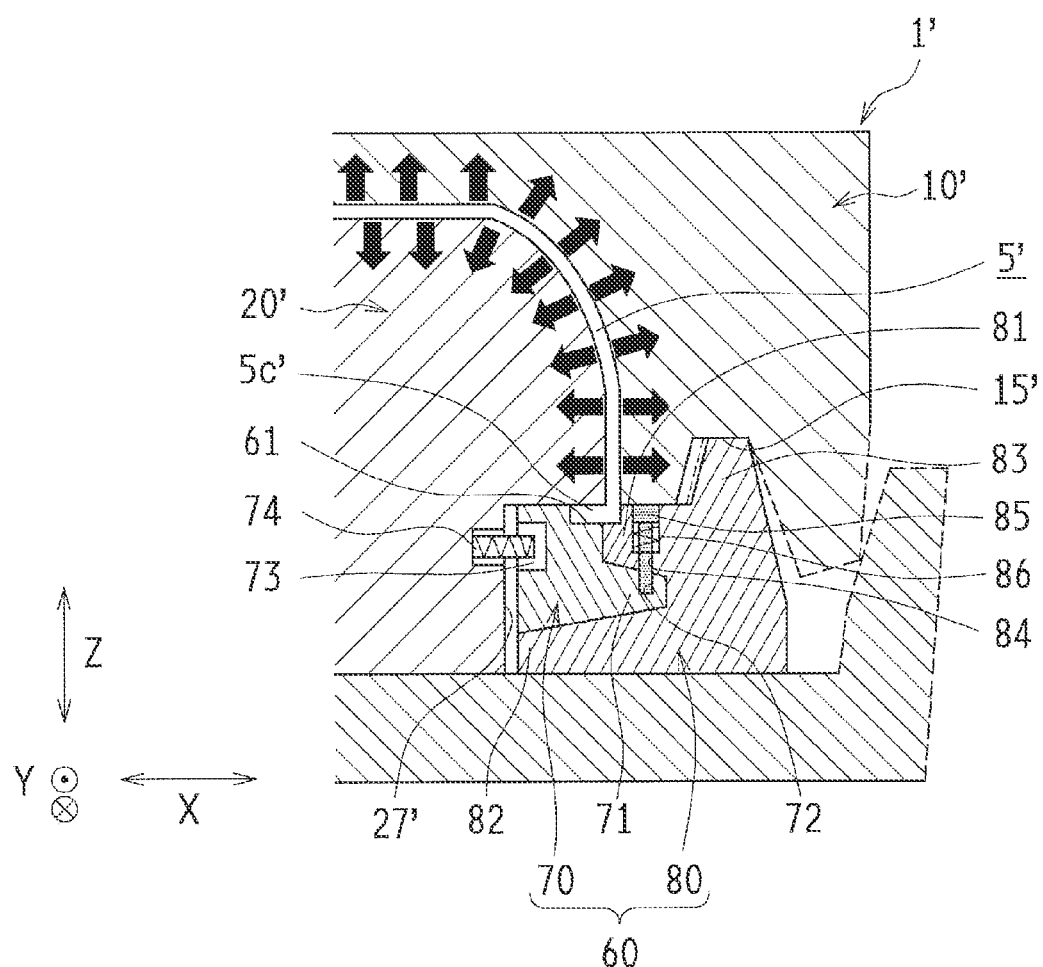
FIG. 12 is a view schematically showing an injection molding die according to the second embodiment of the disclosure.

FIG. 12 is a view schematically showing the injection molding die 1' according to the present embodiment. In this injection molding die 1', a lateral cavity portion 5' has a space portion (a second cavity portion) 5c' that extends inward in the second orthogonal direction X from a lower end portion thereof in the die opening/closing direction Z. This space portion corresponds to the relatively long undercut portion 90c of the bumper 90.

The demolding core 60 has the elongated inner core portion 70 that extends in the first orthogonal direction Y, and the elongated outer core portion 80 that extends in the first orthogonal direction Y, and is formed in an elongated shape extending in the first orthogonal direction Y by combining this inner core portion 70 and this outer core portion 80 with each other in the second orthogonal direction X. More specifically, the inner core portion 70 has a projecting streak portion 71 that protrudes outward in the second orthogonal direction X, whereas the outer core portion 80 has an upper projecting streak portion 81 and a lower projecting streak portion 82 that are vertically spaced apart from each other and that protrude inward in the second orthogonal direction X. The inner core portion 70 and the outer core portion 80 are combined with each other in a dividable manner in the second orthogonal direction X, through the fitting of the projecting streak portion 71 between the upper projecting streak portion 81 and the lower projecting streak portion 82.

Incidentally, the inner core portion 70 and the outer core portion 80 are linked with each other by a rod (not shown) that extends in the second orthogonal direction X and a spring (not shown) that urges the inner core portion 70 and the outer core portion 80 away from each other in the second orthogonal direction X, at a cross-sectional position different from the cross-section of FIG. 12. The inner core portion 70 and the outer core portion 80 are configured to be spaced apart from each other in the second orthogonal direction X without completely separating from each other in the case where no other force acts thereon. Besides, the inner core portion 70 and the outer core portion 80 are configured to advance and retreat in the second orthogonal direction X through the use of the drive mechanism (not shown).

Besides, a corner portion of an upper end portion of the inner core portion 70 outside in the second orthogonal direction X, and a corner portion of an upper end portion of the upper projecting streak portion 81 inside in the second orthogonal direction X are both notched. With the inner core portion 70 and the outer core portion 80 combined with each other, the notched portions are combined with each other to form a recessed streak portion 61 that extends in the first orthogonal direction Y. Therefore, when the demolding core 60 is arranged across the fixed die 10' and the movable die 20' in the second orthogonal direction X while being fitting in a dug portion 27' formed in the movable die 20' with the inner core portion 70 and the outer core portion 80 combined with each other, this recessed streak portion 61 defines a space portion 5c' of the lateral cavity portion 5' corresponding to the undercut portion 90c.

Furthermore, a projection portion 83 that is fitted in (engaged with) a recess portion 15' formed in the fixed die 10' and recessed in the die opening/closing direction Z with substantially no play and that protrudes in the die opening/closing direction Z is formed on the outer core portion 80. Therefore, when the movable die 20' is moved toward the fixed die 10' and clamped, the projection portion 83 is fitted in the recess portion 15'. On the other hand, when the movable die 20' is moved away from the fixed die 10' and opened, the projection portion 83 is disengaged from the recess portion 15'. As described hitherto, the outer core portion 80 and the fixed die 10' are engaged with each other removably in the die opening/closing direction Z. However, in the die clamping state, the projection portion 83 is fitted in the recess portion 15' with substantially no play. Thus, when the fixed die 10' deforms outward in the second orthogonal direction X, the outer core portion 80 is pulled outward in the second orthogonal direction X.

Next, the configuration of prohibiting the inner core portion 70 and the outer core portion 80 from being divided from each other in the die clamping state will be described.

First of all, as shown in FIG. 12, the movable die 20' has the dug portion 27' in which the demolding core 60 is fitted. A top 73 that extends in the second orthogonal direction X, and a disc spring 74 that urges the top 73 outward in the second orthogonal direction X are provided in the dug portion 27'. Thus, the inner core portion 70 fitted in the dug portion 27' is pressed outward in the second orthogonal direction X by the top 73 that is urged by the disc spring 74. Incidentally, the urging force of the disc spring 74 is set larger than the urging force of the above-mentioned spring that urges the inner core portion 70 and the outer core portion 80 away from each other in the second orthogonal direction X.

Besides, the inner core portion 70 has the projecting streak portion 71 that is fitted between the upper projecting streak portion 81 and the lower projecting streak portion 82, and a first hole portion 72 that extends in the die opening/closing direction Z is formed in the projecting streak portion 71. On the other hand, a second hole portion 84 that extends in the die opening/closing direction Z is formed in the upper projecting streak portion 81 of the outer core portion 80. This first hole portion 72 and this second hole portion 84 are formed at such positions that an axial center of the first hole portion 72 and an axial center of the second hole portion 84 coincide with each other, with the inner core portion 70 and the outer core portion 80 combined with each other.

Furthermore, as shown in FIG. 12, a positioning pin 85 is inserted in the second hole portion 84 of the outer core portion 80, and a spring 86 that urges this positioning pin 85 upward in the die opening/closing direction Z (toward the fixed die 10' side) is provided in the second hole portion 84.

Figure 13A:
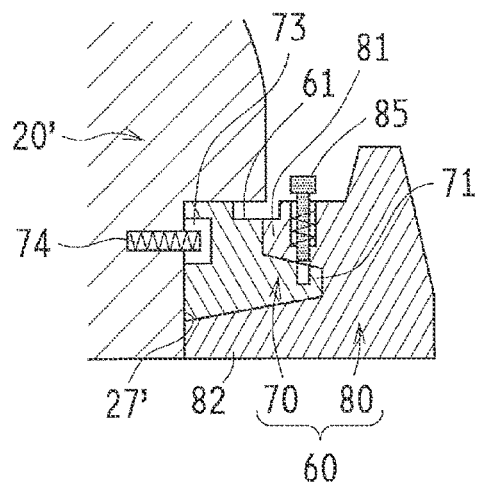
FIG. 13A is a view schematically illustrating the operation of a demolding core.

Each of FIGS. 13A to 13E is a view schematically illustrating the operation of the demolding core 60. As shown in FIG. 13A, when the demolding core 60 is fitted in the dug portion 27' through the use of the drive mechanism, the inner core portion 70 is pressed outward in the second orthogonal direction X by the top 73 that is urged by the disc spring 74, and is pressed against the outer core portion 80.

As a result, the projecting streak portion 71 is fitted between the upper projecting streak portion 81 and the lower projecting streak portion 82.

Figure 13B:
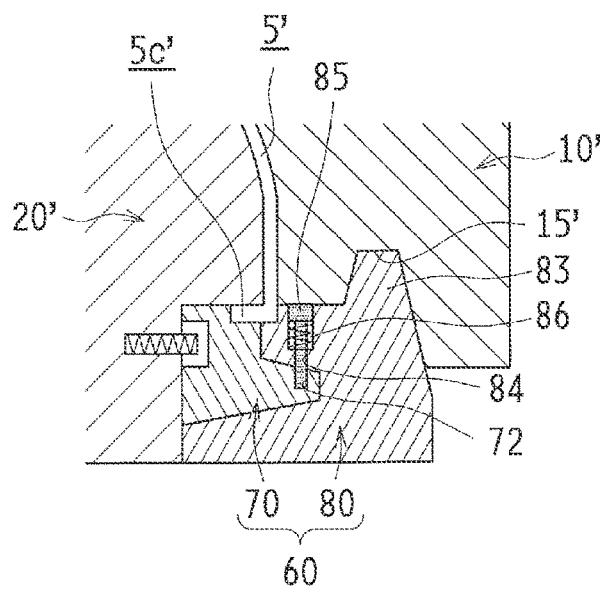
FIG. 13B is a view schematically illustrating the operation of the demolding core.

Then, as shown in FIG. 13B, when the movable die 20' is moved toward the fixed die 10' and clamped, the projection portion 83 of the outer core portion 80 is fitted in the recess portion 15' of the fixed die 10', and the positioning pin 85 inserted in the second hole portion 84 is inserted into the first hole portion 72 against an urging force of the spring 86 by being pressed by the fixed die 10'. As described hitherto, in the die clamping state, the positioning pin 85 is inserted in the first hole portion 72 of the inner core portion 70 and the second hole portion 84 of the outer core portion 80, so the inner core portion 70 and the outer core portion 80 are prohibited from being divided from each other. Therefore, in relation to the claims, the first hole portion 72, the second hole portion 84, the positioning pin 85, and the spring 86 are equivalent to "the prohibitor that prohibits the inner core portion and the outer core portion from being divided from each other in the die clamping state".

As described hitherto, in the die clamping state, the inner core portion 70 and the outer core portion 80 are prohibited from being divided from each other, and the projection portion 83 is fitted in the recess portion 15' with substantially no play. Thus, when the fixed die 10' deforms outward in the second orthogonal direction X in the elastic region thereof, the entire demolding core 60 moves outward in the second orthogonal direction X following the deformation of the fixed die 10'. Therefore, as is the case with the demolding core 30, it is possible not only to restrain burrs from being produced as a result of the opening of the fixed die 10' and the movable die 20', but also to restrain burrs from being produced as a result of the opening of the inner core portion 70 and the outer core portion 80.

Figure 13C:
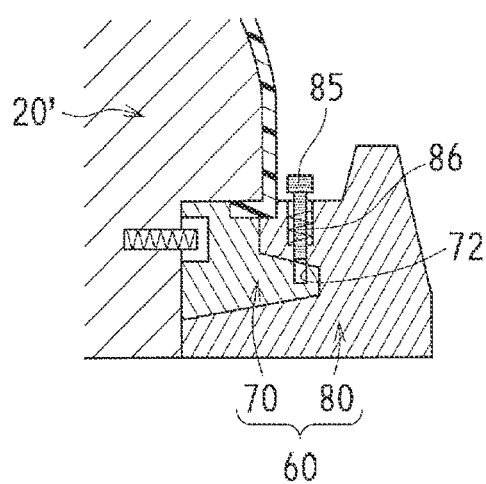
FIG. 13C is a view schematically illustrating the operation of the demolding core.
Figure 13D:
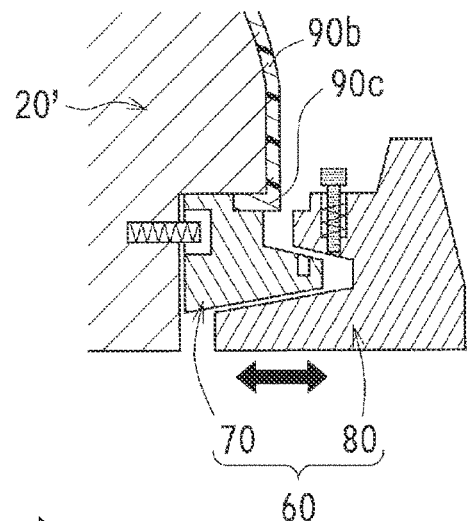
FIG. 13D is a view schematically illustrating the operation of the demolding core.

Then, as shown in FIG. 13C, when the movable die 20' is moved away from the fixed die 10' and opened after the completion of molding, the positioning pin 85 leaves the first hole portion 72 due to the urging force of the spring 86, so the inner core portion 70 and the outer core portion 80 can be divided from each other.

As described above, the inner core portion 70 and the outer core portion 80 are configured to be spaced apart from each other in the second orthogonal direction X by the spring. Thus, when the inner core portion 70 and the outer core portion 80 can be divided from each other, the outer core portion 80 moves away from the inner core portion 70, and a gap is created between the outer core portion 80 and the undercut portion 90c, as indicated by a blackened arrow in FIG. 13D.

Figure 13E:
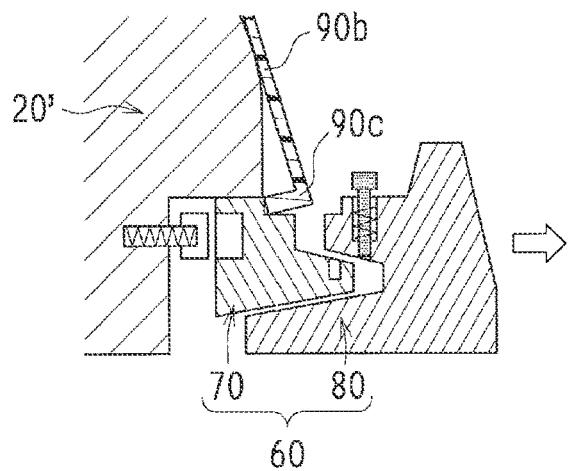
FIG. 13E is a view schematically illustrating the operation of the demolding core.

Then, as indicated by a blank arrow in FIG. 13E, when the outer core portion 80 is pulled outward in the second orthogonal direction X by the drive mechanism, the inner core portion 70 and the outer core portion 80 move outward in the second orthogonal direction X, with a gap created between the inner core portion 70 and the outer core portion 80. When the inner core portion 70 moves outward in the second orthogonal direction X, the undercut portion 90c also moves outward in the second orthogonal direction X, and is stopped from being hooked on the movable die 20'. At this time, there is a gap created between the outer core portion 80 and the undercut portion 90c, so the recessed streak portion 61 of the demolding core 60 and the undercut portion 90c do not interfere with each other. Therefore, the molded product 90 can be restrained from being damaged, while restraining burrs from being produced.

Other Embodiments

The disclosure is not limited to the embodiments thereof, but can be carried out in various other forms without departing from the spirit or main features thereof.

In the aforementioned first embodiment, the disclosure is applied to the injection molding die 1 for molding the bumper 90. However, the disclosure may be applied to an injection molding die for molding a molded product other than the bumper 90, as long as a cavity that extends in a die opening/closing direction and a direction orthogonal to the die opening/closing direction is included therein.

Besides, in the aforementioned first embodiment, the demolding core 30 and the following core 40 are used in combination with each other. However, the disclosure is not limited to this, and only the following core 40 may be used, if the deformation itself of the fixed die 10 at the lower end portion thereof in the die opening/closing direction Z can be suppressed by, for example, holding the cotter 18 of the fixed die 10 in contact with the movable die 20.

Furthermore, in the aforementioned first embodiment, the demolding core 30 is applied to the lower end portion of the lateral cavity portion 5 in molding the molded product having the undercut portion, but the disclosure is not limited thereto. In molding a molded product having no undercut portion, a following core that is substantially identical in shape to the demolding core 30 except in the absence of the recessed streak portion 31 may be applied to the lower end portion of the lateral cavity portion 5. Even in the case where a molded product having no undercut portion is molded, the use of such a following core makes it possible to restrain burrs from being produced in the molded product, through the outward movement of the following core in the second orthogonal direction X following the fixed die that deforms outward in the second orthogonal direction X in the elastic region thereof.

As described hitherto, the above-mentioned embodiments are nothing more than exemplifications in all respects, and should not be restrictively construed. Furthermore, all the modifications and alterations that fall within a range equivalent to the claims are encompassed by the disclosure.

The disclosure can restrain burrs from being produced as a result of the opening of the die components at the time of molding, and hence is very advantageously applicable to an injection molding die having a cavity portion that extends along a die opening/closing direction and a direction orthogonal to the die opening/closing direction.

What is claimed is:

1. An injection molding device that is equipped with an outer die for molding an outer surface side of a molded product and an inner die for molding an inner surface side of the molded product, one of the outer die and the inner die moving in an opening/closing direction relatively to another one of the outer die and the inner die that is fixed in the opening/closing direction, and a cavity that is formed between the outer die and the inner die in a mold clamping state including a first cavity portion that extends along the opening/closing direction and a first orthogonal direction orthogonal to the opening/closing direction, the injection molding device further comprising:
  a core extending across the outer die and the inner die in a second orthogonal direction orthogonal to the opening/closing direction and the first orthogonal direction, wherein the core defines at least part of an end portion of the first cavity portion, and wherein
  the core is configured to be movable in the second orthogonal direction while defining the end portion across the outer die and the inner die in the mold clamping state, and to be engaged with the outer die with substantially no play in the second orthogonal direction while in the mold clamping state before molten resin is injected into the cavity.

2. The injection molding device according to claim 1, wherein
the core and the outer die are engaged with each other at a projection portion that is provided on one of the core and the outer die and that protrudes in the opening/closing direction, and a recess portion that can have the projection portion fitted therein, that is provided in the other of the core and the outer die, and that is recessed in the opening/closing direction.

3. The injection molding device according to claim 1, wherein
the core defines at least part of the end portion of the first cavity portion in the first orthogonal direction, and is attached, with a play in the second orthogonal direction, to a region of the inner die where the cavity is not formed.

4. The injection molding device according to claim 3, wherein
the core is configured as a slide core that is movable in the first orthogonal direction.

5. The injection molding device according to claim 1, wherein
the core defines an end portion of the first cavity portion in the opening/closing direction.

6. The injection molding device according to claim 5, wherein
the first cavity portion has a second cavity portion that corresponds to a relatively long undercut portion of the molded product and that extends in the second orthogonal direction from an end portion thereof in the opening/closing direction toward the inner die side,
the core has an inner core portion and an outer core portion that can be combined with each other in the second orthogonal direction in a dividable manner, and that define the second cavity portion together when combined with each other,
the outer core portion is configured to be engaged with the outer die in the mold clamping state with substantially no play in the second orthogonal direction, and
a prohibitor that prohibits the inner core portion and the outer core portion from being divided from each other in the mold clamping state is further provided.

7. The injection molding device according to claim 6, wherein
the prohibitor has a first hole portion that is formed through the inner core portion and that extends in the opening/closing direction, a second hole portion that has a second axial center coinciding with a first axial center of the first hole portion with the inner core portion and the outer core portion combined with each other, that is formed through the outer core portion, and that extends in the opening/closing direction, a positioning pin that is inserted into the second hole portion, and a spring that urges the positioning pin toward an opposite side of the first hole portion in the opening/closing direction, and
the positioning pin is configured to be inserted into the first hole portion against an urging force of the spring, by being pressed by the outer die, in the mold clamping state.

8. The injection molding device according to claim 1, wherein the outer die is fixed in the opening/closing direction and the inner die is movable in the opening/closing direction.

9. The injection molding device according to claim 2, wherein the projection portion is a part of the core, and the recess portion is formed in the outer die, and the projection portion protrudes toward the outer die so as to be fitted in the recess portion of the outer die.

10. The injection molding device according to claim 9, wherein the projection portion is located in an end side from the first cavity portion in the second orthogonal direction.

* * * * *